US009537883B2

(12) United States Patent
Bachar et al.

(10) Patent No.: US 9,537,883 B2
(45) Date of Patent: Jan. 3, 2017

(54) PROCESS SECURITY VALIDATION

(71) Applicant: International Business Machines Corporation, Armonk, NY (US)

(72) Inventors: Ronen Bachar, Kiryat Ono (IL); Roee Hay, Haifa (IL); Erez Rokah, Shlomo HaMelech (IL); Yoav Shany, Tel-Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 14/578,530

(22) Filed: Dec. 22, 2014

(65) Prior Publication Data

US 2016/0182549 A1    Jun. 23, 2016

(51) Int. Cl.
*G06F 11/00*    (2006.01)
*H04L 29/06*    (2006.01)

(52) U.S. Cl.
CPC ................... *H04L 63/1433* (2013.01)

(58) Field of Classification Search
CPC ............. H04L 63/1416; H04L 63/1408; H04L 63/145; G06F 11/00
See application file for complete search history.

(56) References Cited

U.S. PATENT DOCUMENTS

| | | | | |
|---|---|---|---|---|
| 5,892,959 | A * | 4/1999 | Fung | G06F 1/3203 713/320 |
| 8,281,175 | B2 | 10/2012 | Blackburn et al. | |
| 8,347,373 | B2 * | 1/2013 | Crawford | H04L 49/90 726/12 |
| 2006/0143612 | A1 | 6/2006 | Cromer et al. | |
| 2012/0079596 | A1 * | 3/2012 | Thomas | G06F 21/55 726/24 |
| 2012/0159209 | A1 | 6/2012 | Stemen et al. | |
| 2013/0151839 | A1 | 6/2013 | Rowles et al. | |
| 2013/0159729 | A1 * | 6/2013 | Thom | G06F 21/57 713/189 |

(Continued)

OTHER PUBLICATIONS

"Detecting Application Idleness," Nov. 19, 2014, Can be found at: URL: http://www.codeproject.com/Articles/13756/Detecting-Application-Idleness, 5 pages.

*Primary Examiner* — Ali Abyaneh
(74) *Attorney, Agent, or Firm* — Cantor Colburn LLP; Ed Choi (57) ABSTRACT

Techniques for process security validation are described herein. In one example, a method includes determining, via a processor, that a process is in a first idle state based at least in part on system activity and process activity being below an activity threshold. The method can include detecting, via the processor, that the first idle state of the process transitions to an active state of the process based at least in part on the system activity or the process activity being above the activity threshold, and detecting, via the processor, that the active state of the process transitions to a second idle state based at least in part on the system activity and the process activity being below the activity threshold. Furthermore, the method can include generating, via the processor, the security validation data in response to detecting that the process has executed malicious content during the active state.

19 Claims, 6 Drawing Sheets

(56) References Cited

U.S. PATENT DOCUMENTS

| | | | | |
|---|---|---|---|---|
| 2013/0276116 A1* | 10/2013 | McRae | ............... | G06F 21/53 |
| | | | | 726/23 |
| 2013/0297668 A1* | 11/2013 | McGrath | ............ | G06F 9/485 |
| | | | | 709/201 |
| 2015/0082432 A1* | 3/2015 | Eaton | ............... | H04L 47/785 |
| | | | | 726/23 |
| 2015/0356301 A1* | 12/2015 | Diehl | ............... | G06F 21/577 |
| | | | | 726/22 |
| 2016/0042179 A1* | 2/2016 | Weingarten | ....... | G06F 21/566 |
| | | | | 726/23 |

* cited by examiner

PROCESS SECURITY VALIDATION

BACKGROUND

The present invention relates to security validation, and more specifically, but not exclusively, to detecting security validation data for a process.

Value-based dynamic security analysis validation is based on injecting a value as a part of an attack upon computer system security and checking if that value (or an acceptable variant of the value) has reached a sink, where a sink is a security sensitive operation. Dynamic security analysis of a computer system typically involves instantiation of an application with a certain attack payload, validating the attack and continuing to a next attack for analysis. It can be challenging to accurately determine when an attack is non-vulnerable such that the security analysis can continue to move on to the next attack. Validation can be performed by monitoring sinks after waiting a sufficient period of time to allow the application to execute any code that might trigger vulnerability. For example, an application may access a web service, wait for a response and only then execute a database query that can lead to injecting the value.

SUMMARY

According to an embodiment described herein, a method for process security validation can include determining, via a processor, that a process is in a first idle state based at least in part on system activity and process activity being below an activity threshold and detecting, via the processor, that the first idle state of the process transitions to an active state of the process based at least in part on the system activity or the process activity being above the activity threshold. The method can also include detecting, via the processor, that the active state of the process transitions to a second idle state based at least in part on the system activity and the process activity being below the activity threshold and generating, via the processor, the security validation data in response to detecting that the process has executed malicious content during the active state.

According to another embodiment described herein, a system for process security validation can include a memory component to store processor executable instructions; and a processor that, when executing the processor executable instructions, determines that a process is in a first idle state based at least in part on system activity and process activity being below an activity threshold. The processor can also detect that the first idle state of the process transitions to an active state of the process based at least in part on the system activity or the process activity being above the activity threshold, the active state being a simulated environment, and detect that the active state of the process transitions to a second idle state of the process based at least in part on the system activity and the process activity being below the activity threshold. Furthermore, the processor can generate security validation data in response to detecting that the process has executed malicious content during the active state.

According to another embodiment described herein, a computer program product for process security validation can include a computer readable storage medium having program instructions embodied therewith, where the computer readable storage medium is not a transitory signal per se, the program instructions executable by a processor to cause the processor to determine, via the processor, that a process is in a first idle state based at least in part on system activity and process activity being below an activity threshold. The program instructions executable by the processor can also cause the processor to detect, via the processor, that the first idle state of the process transitions to an active state of the process based at least in part on the system activity or the process activity being above the activity threshold and detect, via the processor, that the active state of the process transitions to a second idle state of the process based at least in part on the system activity and the process activity being below the activity threshold. Furthermore, the program instructions executable by the processor can also cause the processor to detect, via the processor, that the process executed malicious content during the active state, and generate, via the processor, security validation data, the security validation data including runtime information corresponding to the execution of the malicious content.

DETAILED DESCRIPTION

Software applications are increasingly sharing data with a growing number of hardware components, additional applications, and external computing devices. For example, many mobile devices include software applications that frequently request data from any number of external computing devices and server applications. In some examples, a software application can request data from an external source and receive malicious content in response. For example, an application for a mobile device may request data stored in a database on a web server and the web server may respond with malicious content or data. In some instances, testing a software application for vulnerabilities based on whether the software application has executed malicious content can be challenging.

According to embodiments of the present disclosure, a computing device can detect security validation data. Security validation data, as referred to herein, can include any suitable information related to an application that has executed a set of instructions related to malicious content. For example, the security validation data may indicate that an application has executed a set of instructions that include retrieving malicious content from an external source. In some embodiments, a computing device can detect that the application has completed executing a set of instructions based on a transition from a first idle state, to an active state, to a second idle state. The computing device can also determine if the application has a vulnerability based on whether the application has executed malicious content during an active state. Malicious content, as referred to herein, can include any computer code that can be executed without a user's knowledge or consent. In some examples, the malicious content can include computer code from any suitable dynamic scripting language, among others.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
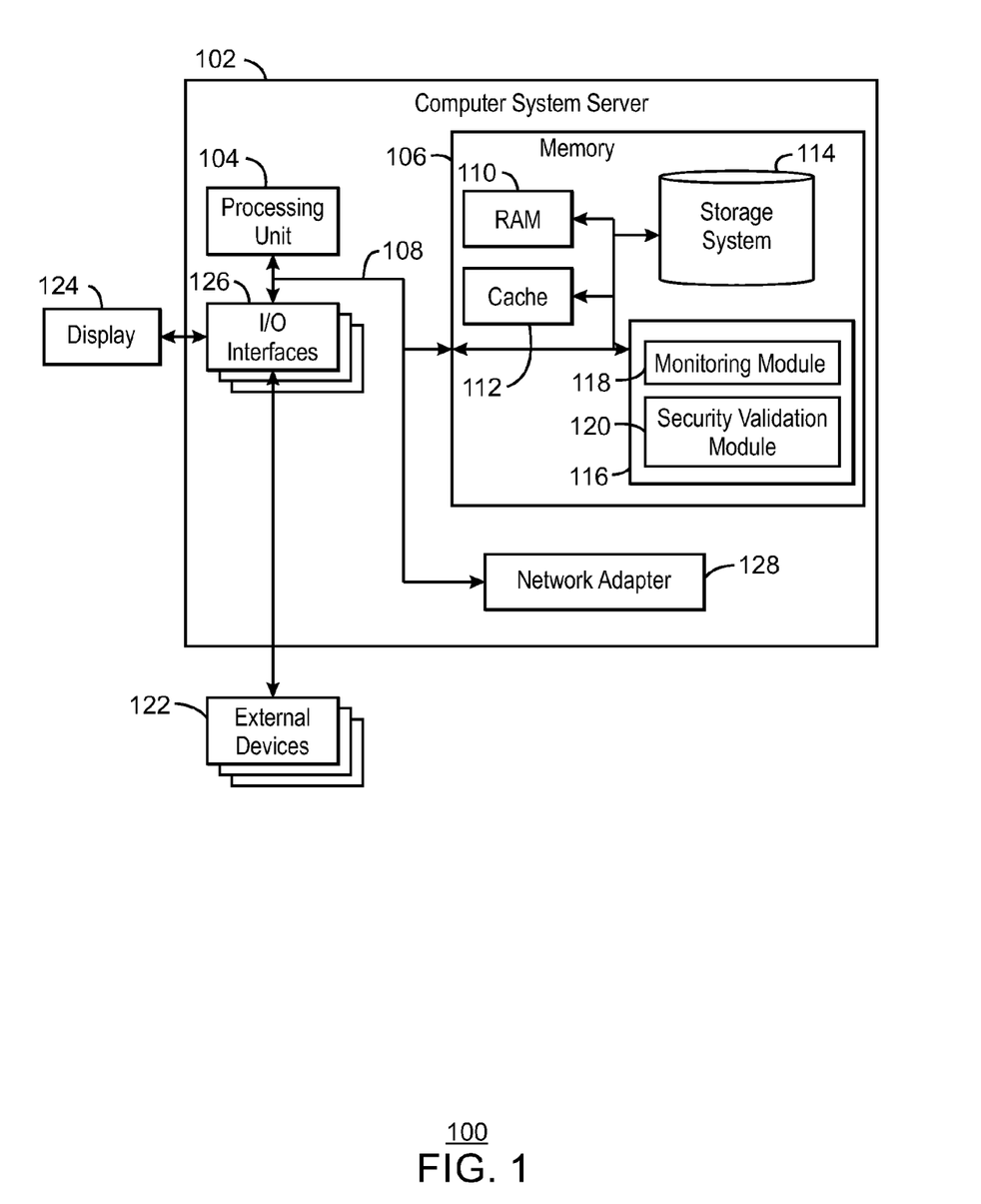
FIG. 1 depicts a block diagram of a cloud computing node that can detect security validation data according to an embodiment described herein.

Referring now to FIG. 1, a schematic of an example of a cloud computing node that can detect security validation data is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth herein.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116 having a set (at least one) of program modules, such as monitoring module 118 and security validation module 120, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. The monitoring module 118 and the security validation module 120 generally carry out the functions and/or methodologies of embodiments of the invention as described herein.

Computer system/server 102 may also communicate with one or more external devices 122 such as a keyboard, a pointing device, a display 124, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 126. Still yet, computer system/server 102 can communicate with one or more networks such as a local area network (LAN), a general wide area network (WAN), and/or a public network (e.g., the Internet) via network adapter 128. As depicted, network adapter 128 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

In some embodiments, the monitoring module 118 can test an application for a vulnerability by sending an application stored in the memory component 106 a request to retrieve malicious content from the storage system 114 or external device 122, among others. The monitoring module 118 can isolate the execution of the application and monitor the execution of the application to determine when the application transitions from a first idle state, to an active state, to a second idle state. In some examples, the first idle state can indicate when an application and a computer system/server 102 executing the application have an activity level below an activity threshold, which may be quantified as a predetermined number corresponding to a log rate, and/or a processor usage rate as further described herein. For example, when the computer system/server 102 and the application are both idle, the activity level may be below an activity threshold. In an active state, the computer system/server 102 or the application executes instructions, which can indicate that the activity level is above an activity threshold. In some embodiments, the monitoring module 118 can indicate that the computer system/server 102 and the application have transitioned from an active state to a second idle state. The monitoring module 118 can then determine if a process or application being monitored has executed malicious content retrieved from the storage system 114. In some embodiments, the security validation module 120 can generate security validation data in response to detecting that an application has executed malicious content during an active state. For example, the security validation module 120 can store runtime information during the active state of the application and send the runtime information as security validation data to any suitable application, operating system, or external device 122.

It is to be understood that the block diagram of FIG. 1 is not intended to indicate that the computing system/server 102 is to include all of the components shown in FIG. 1. Rather, the computing system/server 102 can include fewer or additional components not illustrated in FIG. 1 (e.g., additional memory components, embedded controllers, additional modules, additional network interfaces, etc.). Furthermore, any of the functionalities of the monitoring module 118, and the security validation module 120 may be partially, or entirely, implemented in hardware and/or in the processing unit (also referred to herein as processor) 104. For example, the functionality may be implemented with an application specific integrated circuit, or in logic implemented in the processor 104, among others.

Figure 2:
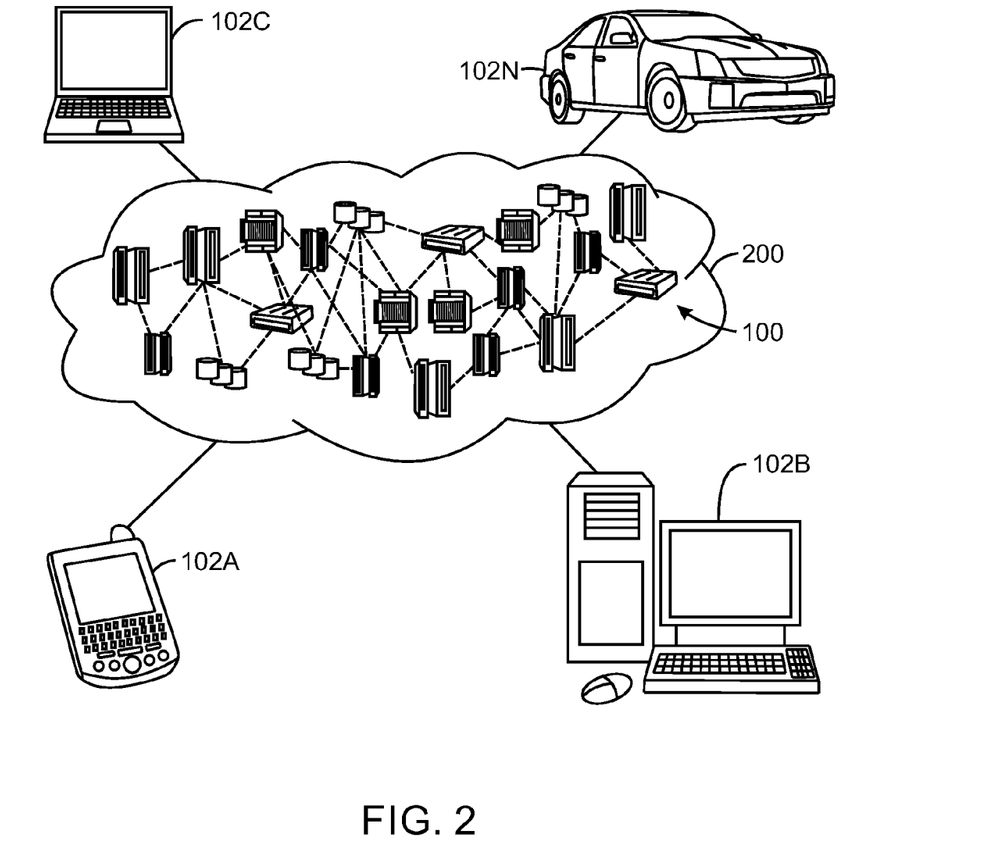
FIG. 2 depicts a cloud computing environment that can detect security validation data according to an embodiment described herein.

Referring now to FIG. 2, an illustrative cloud computing environment 200 that can detect security validation data is depicted. As shown, cloud computing environment 200 includes one or more cloud computing nodes 100 with which local computing devices used by cloud consumers, such as, for example, personal digital assistant (PDA) or cellular telephone 102A, desktop computer 102B, laptop computer 102C, and/or automobile computer system 102N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 102A-N shown in FIG. 2 are intended to be illustrative only and that computing nodes 100 and cloud computing environment 200 can communicate with any type of computerized device over any type of network and/or network addressable connection (e.g., using a web browser, among others).

Figure 3:
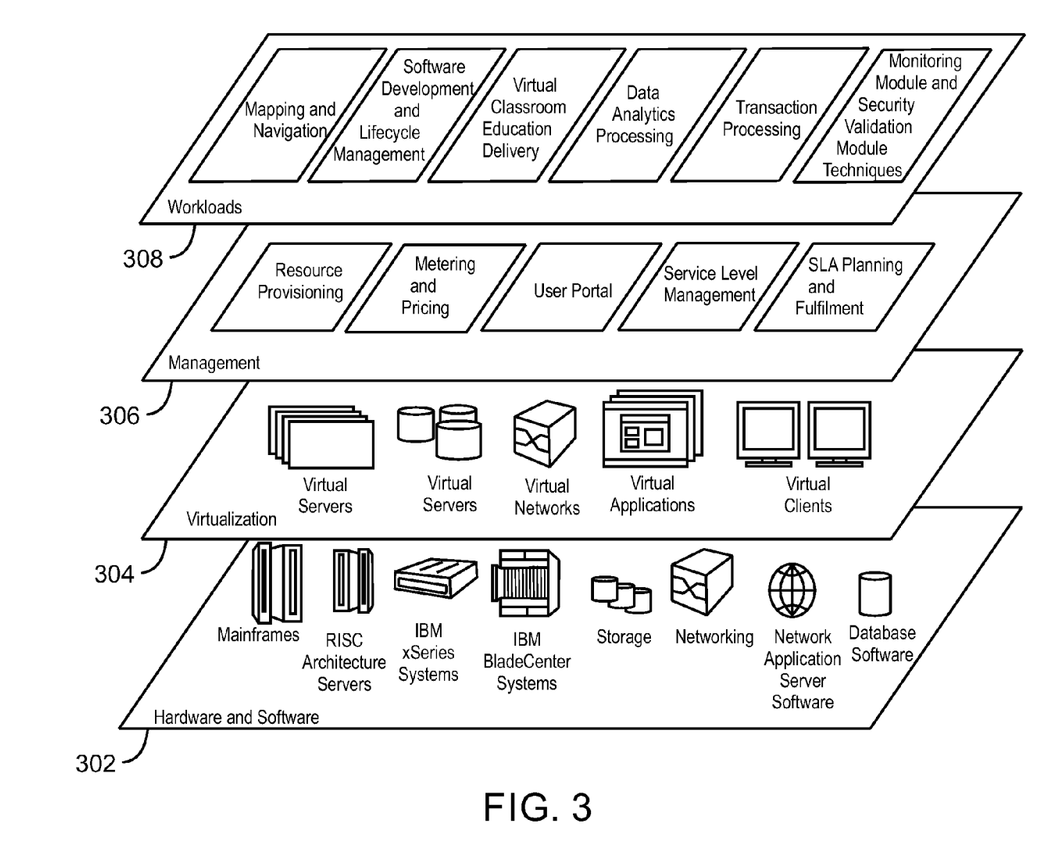
FIG. 3 depicts abstraction model layers used to implement techniques for detecting security validation data according to an embodiment described herein.

Referring now to FIG. 3, a set of functional abstraction layers used to implement techniques for detecting security validation data provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes; RISC (Reduced Instruction Set Computer) architecture based servers; storage devices; networks and networking components. In some embodiments, software components include network application server software.

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; transaction processing; and techniques performed by the monitoring module 118 and the security validation module 120.

Figure 4:
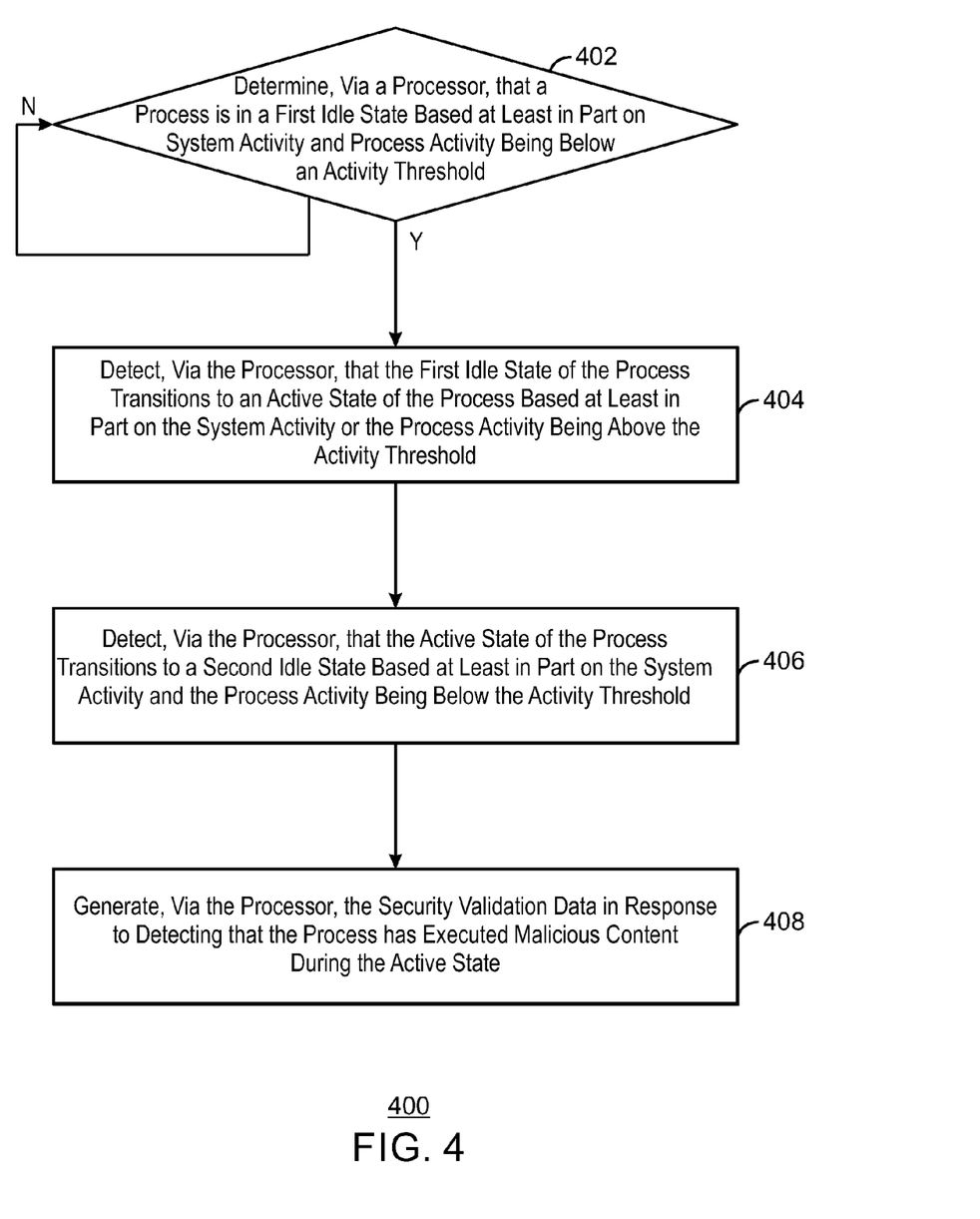
FIG. 4 is a process flow diagram of an example method that can detect security validation data according to an embodiment described herein.

FIG. 4 is an example of a method that can detect security validation data. The method 400 can be implemented with any suitable computing device, such as the computing system/server 102 of FIG. 1.

At block 402, the monitoring module 118 can determine that a process is in a first idle state based at least in part on system activity and process activity being below an activity threshold. In some embodiments, the process (also referred to herein as an application) can include any suitable software application that is executed on a computing device such as a personal computing device, a mobile device, or a server, among others. As discussed above, an idle state can include any period of time during which an application and the system executing the application execute a number of operations below a predetermined threshold (also referred to herein as activity threshold). In some embodiments, the monitoring module 118 determines if a process is in an idle state by monitoring any suitable number of metrics, such as system activities and process activities. The system activities, as referred to herein, can include any suitable operation that is executed as a result of an application. For example, a system activity can include operations that result in a processor executing instructions to access network resources or user interfaces, or instructions to store data in an activity log, among others. In some embodiments, a system activity can include a log rate that indicates an amount of data being stored in a log file within a predetermined time period. A system activity may also include operations executed by processors in a mobile computing environment. For example, a system activity may include operations, such as intents, that request the processor to execute instructions related to communicating with external devices, a display in a mobile device, or additional applications stored in a mobile device, among others. In some examples, the system activity may be detected by monitoring the processes being executed by a processor based on an identifier associated with each process. For example, system activities may be detected when processes are executed other than an application or process that is being monitored. In some embodiments, a process activity can include any suitable number of operations executed by the process without interacting with additional applications, or computing devices, among others. For example, a process activity may include a number of input or output operation requested by the application, among others. In a mobile computing environment, a process activity may include the execution of any intent within an application that does not communicate data with additional applications, or external devices, among others. In some embodiments, the process activity is detected by monitoring the execution of additional processes that share an identifier with the application or process being monitored.

If the process is in a first idle state, the process flow continues at block 404. Otherwise, the process in not in a first idle state and the process flow remains at block 402.

At block 404, the monitoring module 118 can determine or detect that the first idle state of the process transitions to an active state of the process based at least in part on the system activity or the process activity being above the activity threshold. In some embodiments, the monitoring module 118 can detect when a process transitions from an idle state to an active state by monitoring the system activities and process activities being executed on a system. For example, the monitoring module 118 can determine when an application or process requests the execution of instructions or when a system responds to the execution of an application by monitoring the number of instructions executed by a processor in a period of time. In some embodiments, an activity threshold can represent a processor usage rate that indicates a number of operations executed by a processor within a predetermined period of time. The activity threshold can indicate when a process has transitioned from an idle state, during which time the process does not request the execution of operations, to an active state, during which time the process requests the execution of operations.

In some embodiments, the active state can indicate the execution of a request to retrieve malicious content. For example, the security of an application can be validated by requesting that the application retrieve malicious content from a data store such as a database, among others. The monitoring module 118 can determine that the application executes a retrieve request corresponding to malicious content along with any operations that result from the retrieve request. In some examples, an application with a security vulnerability uses the retrieved malicious content in response to completing a retrieval request operation.

In some embodiments, the active state can indicate the execution of malicious content received from a man in the middle attack. For example, a computing device may request data from a server using an unsecured internet access point such as a public wireless internet hotspot. In some examples, an attacker can detect the request for data and replace the contents of a corresponding response with malicious content such as Javascript code, among others.

An application may also execute any suitable number of operations during an active state of an application such as accessing a database, rending user interface objects, and mathematical calculations, among others. In some embodiments, the active state is in a simulated environment. A simulated environment, as referred to herein, includes any suitable period of time in which a process executes instructions for an application without requesting input from an input device. For example, a simulated environment may include the monitoring module 118 generating instructions as if the instructions originated from an input device. In some embodiments, the simulated environment can automate the generation of security validation data in block 408 below and reduce the latency in testing a process or application for security vulnerabilities.

At block 406, the monitoring module 118 can determine that the process is in a second idle state based at least in part on the system activity and the process activity being below the activity threshold. In some embodiments, the second idle state can indicate that the process has executed the instructions from the active state. In some examples, the second idle state can indicate that a process has completed the execution of any operations associated with malicious content. For example, the second idle state can indicate that any retrieval requests for data corresponding to malicious content have been completed.

At block 408, the security validation module 120 can generate the security validation data in response to detecting that the process has used malicious content during the execution of the process. In some embodiments, the security validation data can indicate if a process or application has a security vulnerability. For example, the security validation data can indicate if a process has executed malicious content retrieved from an external source, among other information. In some embodiments, the security validation data can include stack or heap information, exceptions from stack traces detected using debugging capabilities, and native stack traces detected from system logs, along with any suitable runtime information gathered during the execution of the process.

In some embodiments, the security validation module 120 can detect that a process has a security vulnerability by detecting expected results. For example, the process may use insecure methods of storing files. In some embodiments, the security validation module 120 can detect that a process writes data to a particular file and examine the corresponding file permissions to verify that the process writes data to the particular file with secure techniques.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the monitoring module 118 may repeat blocks 402-406 any suitable number of times and the security validation module 120 may generate security validation data after the detection of each second idle state to determine if a process or application has received malicious content. Furthermore, the method 400 can include sending, via a processor, the malicious content to the process or detecting, via a processor, the process from an external computing device. For example, the method 400 may include sending the malicious content to the process prior to the first idle state and determining if the malicious content was accepted during the active state. In some embodiments, the process to be tested for a security vulnerability is received from an external computing device and executed using an emulator application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
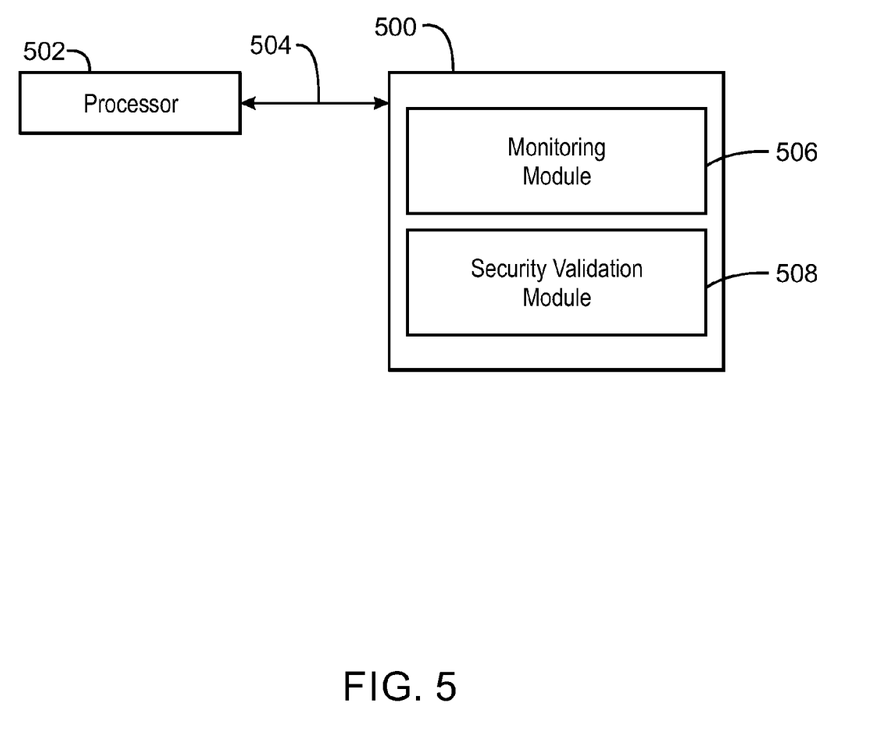
FIG. 5 is a tangible, non-transitory computer-readable medium that can detect security validation data according to an embodiment described herein.

Referring now to FIG. 5, a block diagram is depicted of an example of a tangible, non-transitory computer-readable medium that can detect security validation data. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a monitoring module 506 may monitor an application to determine a transition from a first idle state, to an active state, to a second idle state. A security validation module 508 can determine if the application executed or received malicious content or instructions related to malicious content during the active state.

It is to be understood that any number of additional software components not shown in FIG. 5 may be included within the tangible, non-transitory, computer-readable medium 500, depending on the specific application.

In some embodiments, the process software, such as the monitoring module 118 or 506 and the security validation module 120 or 508 can be shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer.

All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6:
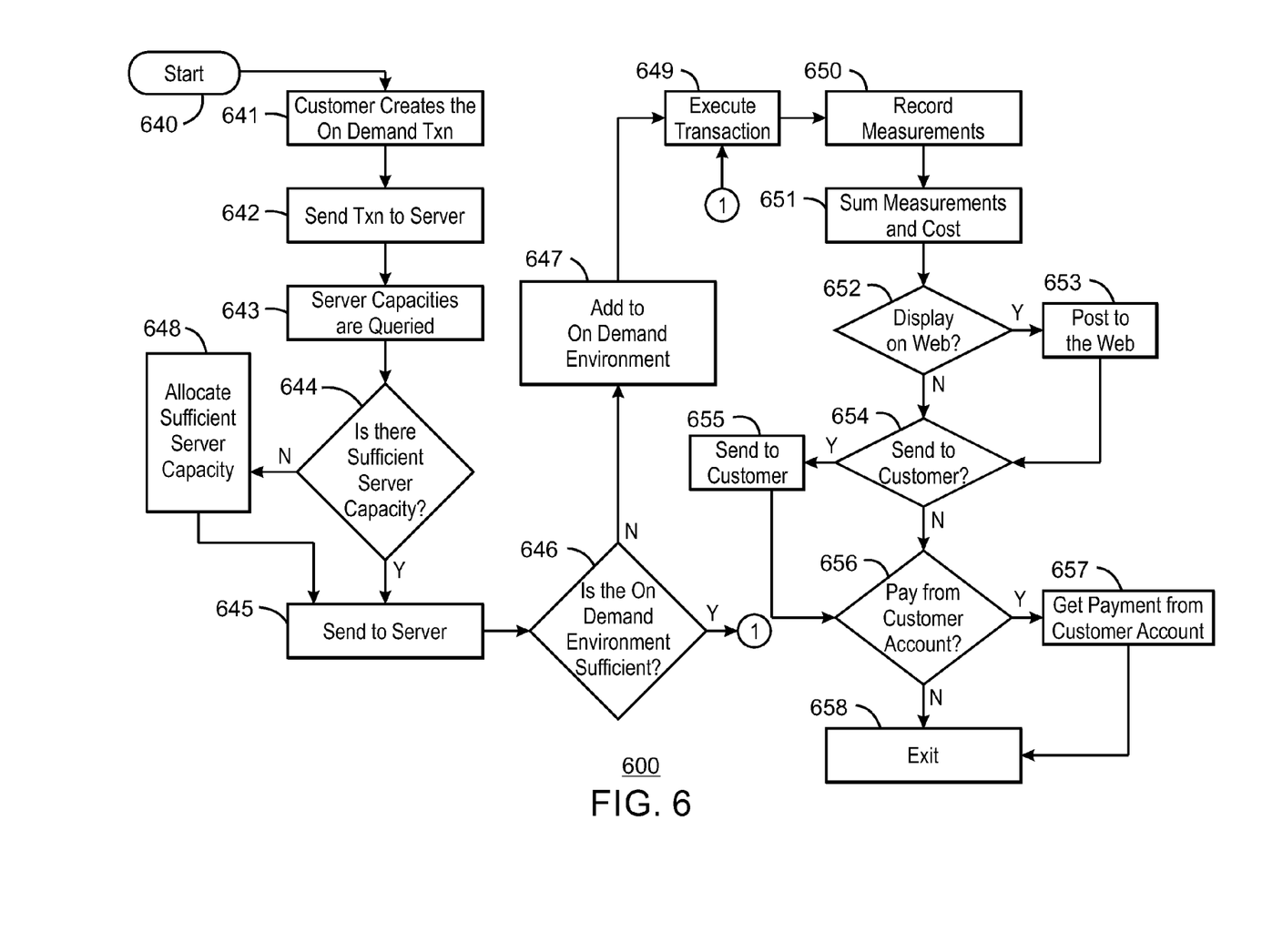
FIG. 6 is a process flow diagram of an on demand process for detecting security validation data according to an embodiment described herein.

Referring to FIG. 6, a process flow diagram for an on demand process for detecting security validation data is provided. Step 640 begins the On Demand process. A transaction is created that contains the unique customer identification, the requested service type and any service parameters that further specify the type of service 641. The transaction is then sent to the main server 642. In an On Demand environment the main server can initially be the only server, and then as capacity is consumed other servers are added to the On Demand environment.

The server central processing unit (CPU) capacities in the On Demand environment are queried 643. The CPU requirement of the transaction is estimated, then the server's available CPU capacity in the On Demand environment is compared to the transaction CPU requirement to see if there is sufficient CPU available capacity in any server to process the transaction 644. If there is not sufficient server CPU available capacity, then additional server CPU capacity is allocated to process the transaction 648. If there was already sufficient Available CPU capacity then the transaction is sent to a selected server 645.

Before executing the transaction, a check is made of the remaining On Demand environment to determine if the environment has sufficient available capacity for processing the transaction. This environment capacity consists of such things as but not limited to network bandwidth, processor memory, storage etc. 646. If there is not sufficient available capacity, then capacity will be added to the On Demand environment 647. Next the required software to process the transaction is accessed, loaded into memory, and then the transaction is executed 649.

The usage measurements are recorded 650. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 651.

If the customer has requested that the On Demand costs be posted to a web site 652 then they are posted 653. If the customer has requested that the On Demand costs be sent via e-mail to a customer address 654 then they are sent 655. If the customer has requested that the On Demand costs be paid directly from a customer account 656 then payment is received directly from the customer account 657. The last step is exit 658 the On Demand process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for process security validation comprising:
   determining, via a processor, that a process is in a first idle state based at least in part on system activity and process activity being below an activity threshold;
   detecting, via the processor, that the first idle state of the process transitions to an active state of the process based at least in part on the system activity or the process activity being above the activity threshold;
   detecting, via the processor, from a simulated environment, that the active state of the process transitions to a second idle state based at least in part on the system activity and the process activity being below the activity threshold; the simulated environment configured to generate instructions as if the instructions originate from an input device without receiving instructions from the input device; wherein the simulated environment comprises a monitoring module configured for generating instructions as if the instructions originated from an external input device; and wherein the simulated environment is configured to automate generation of security validation data and reduce a latency in testing the process transitions; and
   generating, via the processor, the security validation data in response to detecting that the process has executed malicious content during the active state.

2. The method of claim 1, wherein the system activity comprises a log rate that indicates an amount of data being stored in a log file within a predetermined time period.

3. The method of claim 1, comprising detecting the process activity by monitoring an execution of additional processes that share an identifier with the process being monitored.

4. The method of claim 1, wherein the activity threshold comprises a predetermined number corresponding to a log rate, and/or a processor usage rate.

5. The method of claim 1, wherein the security validation data comprises runtime information corresponding to the execution of the malicious content.

6. The method of claim 1, comprising sending, via the processor, the malicious content to the process.

7. The method of claim 1, comprising detecting, via the processor, the process from an external computing device.

8. A system for process security validation comprising:
   a memory component to store processor executable instructions; and a processor that, when executing the processor executable instructions, is to:

determine that a process is in a first idle state based at least in part on system activity and process activity being below an activity threshold;

detect that the first idle state of the process transitions to an active state of the process based at least in part on the system activity or the process activity being above the activity threshold, the active state being a simulated environment;

detect, from the simulated environment, that the active state of the process transitions to a second idle state of the process based at least in part on the system activity and the process activity being below the activity threshold; the simulated environment configured to generate instructions as if the instructions originate from an input device without receiving instructions from the input device; wherein the simulated environment comprises a monitoring module configured for generating instructions as if the instructions originated from an external input device; and wherein the simulated environment is configured to automate generation of security validation data and reduce a latency in testing the process transitions; and generate the security validation data in response to detecting that the process has executed malicious content during the active state.

9. The system of claim 8, wherein the processor executable instructions are provided as a service in a cloud computing environment.

10. The system of claim 8, wherein the system activity comprises a log rate that indicates an amount of data being stored in a log file within a predetermined time period.

11. The system of claim 8, wherein the processor is to detect the process activity by monitoring an execution of additional processes that share an identifier with the process being monitored.

12. The system of claim 8, wherein the system activity comprises a processor usage rate that indicates a number of operations executed by the processor within a predetermined period of time.

13. The system of claim 8, wherein the activity threshold comprises a predetermined number corresponding to a log rate, and/or a processor usage rate.

14. The system of claim 8, wherein the security validation data comprises runtime information corresponding to the execution of the malicious content.

15. A computer program product for process security validation, the computer program product comprising a computer readable storage medium having program instructions embodied therewith, wherein the computer readable storage medium is not a transitory signal per se, the program instructions executable by a processor to cause the processor to:

determine, via the processor, that a process is in a first idle state based at least in part on system activity and process activity being below an activity threshold;

detect, via the processor, that the first idle state of the process transitions to an active state of the process based at least in part on the system activity or the process activity being above the activity threshold;

detect, via the processor, from a simulated environment, that the active state of the process transitions to a second idle state of the process based at least in part on the system activity and the process activity being below the activity threshold; the simulated environment configured to generate instructions as if the instructions originate from an input device without receiving instructions from the input device; wherein the simulated environment comprises a monitoring module configured for generating instructions as if the instructions originated from an external input device; and wherein the simulated environment is configured to automate generation of security validation data and reduce a latency in testing the process transitions;

detect, via the processor, that the process executed malicious content during the active state; and generate, via the processor, the security validation data, the security validation data comprising runtime information corresponding to the execution of the malicious content.

16. The computer program product of claim 15, wherein the system activity comprises a log rate that indicates an amount of data being stored in a log file within a predetermined time period.

17. The computer program product of claim 15, wherein the program instructions executable by the processor to cause the processor to detect the process activity by monitoring an execution of additional processes that share an identifier with the process being monitored.

18. The computer program product of claim 15, wherein the system activity comprises a processor usage rate that indicates a number of operations executed by the processor within a predetermined period of time.

19. The computer program product of claim 15, wherein the activity threshold comprises a predetermined number corresponding to a log rate, and/or a processor usage rate.

* * * * *